(12) United States Patent
Wexler

(10) Patent No.: US 6,925,966 B1
(45) Date of Patent: Aug. 9, 2005

(54) APPARATUS AND METHOD FOR PARTIALLY ENCAPSULATING AN ANIMAL'S HEAD

(76) Inventor: Toby Wexler, 303 Paddington Dr., Lafayette, LA (US) 70508

(*) Notice: Subject to any disclaimer, the term of this patent is extended or adjusted under 35 U.S.C. 154(b) by 0 days.

(21) Appl. No.: 10/630,881

(22) Filed: Jul. 29, 2003

(51) Int. Cl.[7] .................. A01K 13/00; A01K 15/04
(52) U.S. Cl. ................ 119/850; 119/837; 119/815; 119/857; 119/814
(58) Field of Search .............. 119/850, 815, 821, 119/837, 857, 858, 831, 832, 823, 814, 729, 119/762; D29/102

(56) References Cited

U.S. PATENT DOCUMENTS

| | | | | |
|---|---|---|---|---|
| 805,227 | A * | 11/1905 | ONeal | 119/832 |
| 868,145 | A * | 10/1907 | Swender | 119/832 |
| 3,488,771 | A * | 1/1970 | Chase et al. | 2/2.11 |
| 3,514,785 | A * | 6/1970 | Smith | 2/410 |
| 4,200,057 | A * | 4/1980 | Agar | 424/9.8 |
| 4,291,417 | A * | 9/1981 | Pagano | 2/202 |
| 5,291,880 | A * | 3/1994 | Almovist et al. | 128/201.22 |
| 5,349,927 | A * | 9/1994 | Campbell | 119/815 |
| D406,400 | S * | 3/1999 | Munns | D29/107 |
| 5,953,760 | A * | 9/1999 | Powell | 2/424 |
| 6,082,309 | A * | 7/2000 | Wexler | 119/837 |
| 6,227,148 | B1 * | 5/2001 | Wexler | 119/837 |
| 6,382,140 | B2 * | 5/2002 | Wexler | 119/837 |

FOREIGN PATENT DOCUMENTS

DE      3419302 A1 * 11/1985      ............ A42B 3/02

* cited by examiner

Primary Examiner—Peter M. Poon
Assistant Examiner—Andrea M. Valenti
(74) Attorney, Agent, or Firm—Robert N. Montgomery

(57) ABSTRACT

A hemispherical shaped animal protective head shield with detachable optional rings and a pivotal visor member. The hemispherical shield is a transparent shell with an irregular aperture therein covered by a visor having a parabolic notch forming parabolic opening between the visor and shell for inserting an animals head and closing around the animal's neck. Optional elements may be attached to the hemispherical shape, thus forming a cylindrical or conical portion. Hook and latch elements are added for securing the visor in position relative to the hemispherical shell thereby providing infinite adjustment for capturing and partially encapsulating an animal's head.

16 Claims, 7 Drawing Sheets

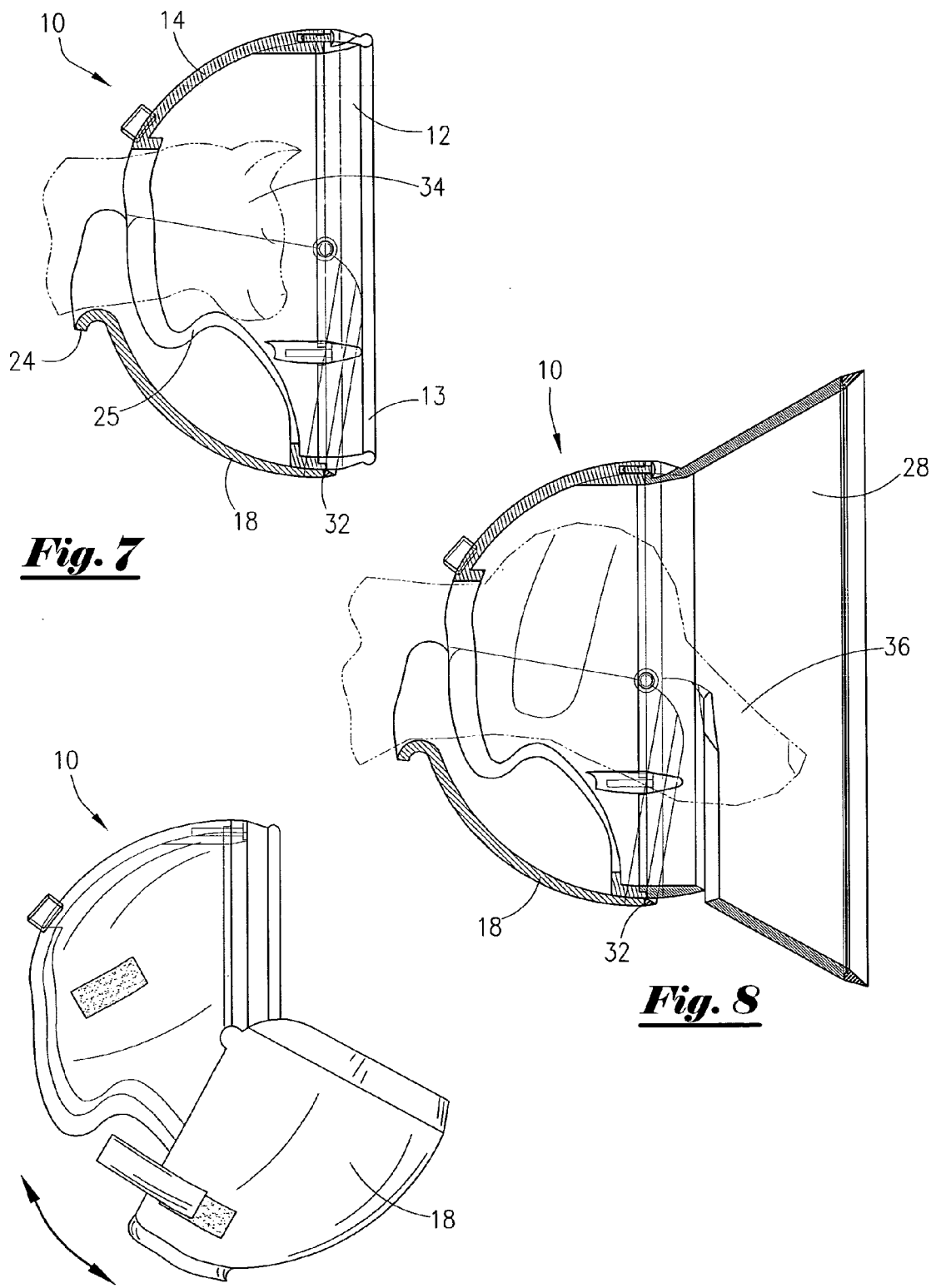

US 6,925,966 B1

APPARATUS AND METHOD FOR PARTIALLY ENCAPSULATING AN ANIMAL'S HEAD

FIELD OF THE INVENTION

This invention relates generally to animal protective collars used to prevent licking and biting of surgical dressings, medicated wounds, etc., and more particularly to a more versatile adaptive apparatus having interchangeable components for accommodating various species and/or breeds. This invention, being an extension of the technology previously disclosed in my U.S. Pat. No. 6,382,140 Issued May 7, 2002, is hereby incorporated by reference.

GENERAL BACKGROUND

E-collars or "Elizabethan" collars, so called in view of their Elizabethan era appearance, have long been used in veterinary practice to protect an animal's head or prevent contact between an animal's head and other parts of its body. The collars are used, for instance, after surgery to prevent an animal from biting or chewing at dressings or areas below its neck, or from pawing or scratching at dressings or areas on or about its head.

Frequently such collars have taken the general shape of a funnel or truncated cone. E-collars are usually closed around the animal's neck and retained in place by interlocking tabs, snaps, lacing, staples, and the like. The E-collars are usually provided in a variety of sizes or size ranges to accommodate animals of various sizes, and the effective size range of a particular collar is often limited by the closure mechanism used. Such closure mechanisms are usually cumbersome and time-consuming to attach and remove and the collars are most often much larger than necessary.

Examples of such collars include both reusable and disposable collars. More recently E-collars include closure mechanisms that involve the use of hook and latch type closures provided on both ends of a collar for allowing some degree of adjustability. However, if not secured properly, the animals may remove the device very quickly or harm themselves in the process. In some cases the E-collar is attached to the animal's existing collar, further encumbering the removal and attachment process. E-collars, due to their construction from a flat plastic sheet, often cause skin irritation as a result of sharp edges.

What is needed is a collar that is quickly and easily attachable and removable and which accommodates a wide variety of sizes within a breed or species. For example, a dog collar should not be used for cats. Nor should one attempt to cut down a universal collar to fit a smaller animal. The collars should also be free from sharp edges.

SUMMARY OF THE INVENTION

An animal collar used to limit range and motion and protect an animal's head; the collar includes a hollow, hemispherical shaped shell with optional detachable cylindrical or conical rings and a pivotal visor. The shell being a hollow, transparent, hemispherical shape with an irregular aperture therein, in combination with the pivotal visor forms a parabolic cutout for closing the irregular aperture around an animal's neck. Hook and latch elements secure the visor in position relative to the hemispherical portion, thereby capturing and partially encapsulating the animal's head.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 7 is a cross section view of the animal collar apparatus with optional cylindrical ring with visor in the closed position;

FIG. 8 is a cross section view of the animal collar apparatus with optional conical ring; and FIG. 9 is a side elevation view of the animal collar apparatus with optional cylindrical ring with the visor in the open position.

DETAILED DESCRIPTION OF THE PREFERRED EMBODIMENT

Figure 1:
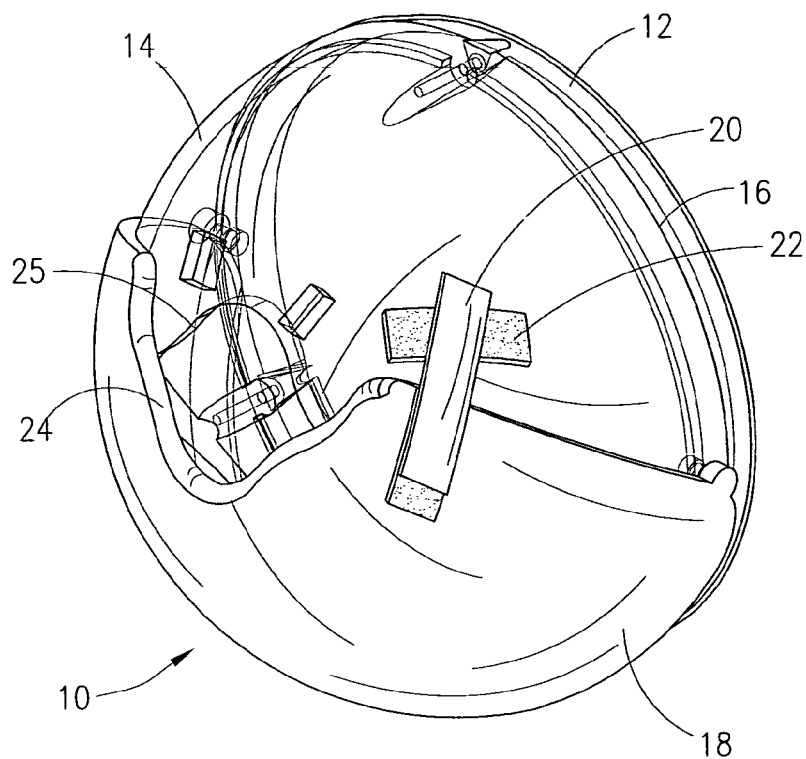
FIG. 1 is an isometric exploded view of the animal collar apparatus with optional cylindrical ring.
Figure 2:
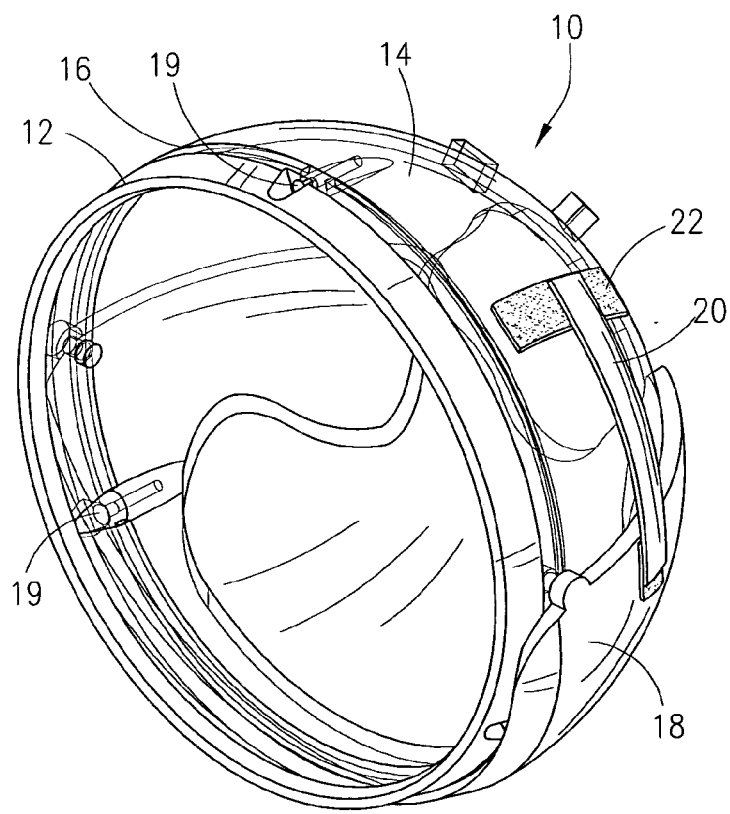
FIG. 2 is an isometric exploded view of the animal collar apparatus with optional conical ring.

As illustrated in FIG. 1, and FIG. 2. the animal head covering serving as an e-collar is a hollow hemispherical shaped assembly 10. The hemispherical assembly 10, as seen from the rear in FIG. 1, the hemispherical portion 14 is generally made of a lightweight, transparent or semitransparent, polymeric material and is generally sized to accommodate the average cat's head. However, various models may be provided to accommodate larger, wild felines, dogs, and smaller animals, such as kittens and small mammals. The hemispherical assembly 10 may also be lightly tinted to provide a more calming effect on the animal. The cylindrical extension ring 12 and the hemispherical portion 14 are removably fastened one to the other at a diametrical parting line 16 along the major diameter of the hemispherical assembly 10. A hinged visor member 18 is effectively captured and pivotal at the connection point of the hemispherical portion 14 at the parting line 16. A hook and latch fastening located at each side of the parabolic notch 24 and aperture 25 (shown on only one side for clarity in FIGS. 1 and 2) is provided for securing the visor member 18 to the lower hemispherical portion 14, composed of a strap portion 20 and a pad portion 22.

As seen in FIG. 2, the cylindrical extension ring portion 12 is attached to the hemispherical portion 14 at the equatorial parting line 16 by fasteners 19 strategically place around the equatorial parting line 16.

Figure 3:
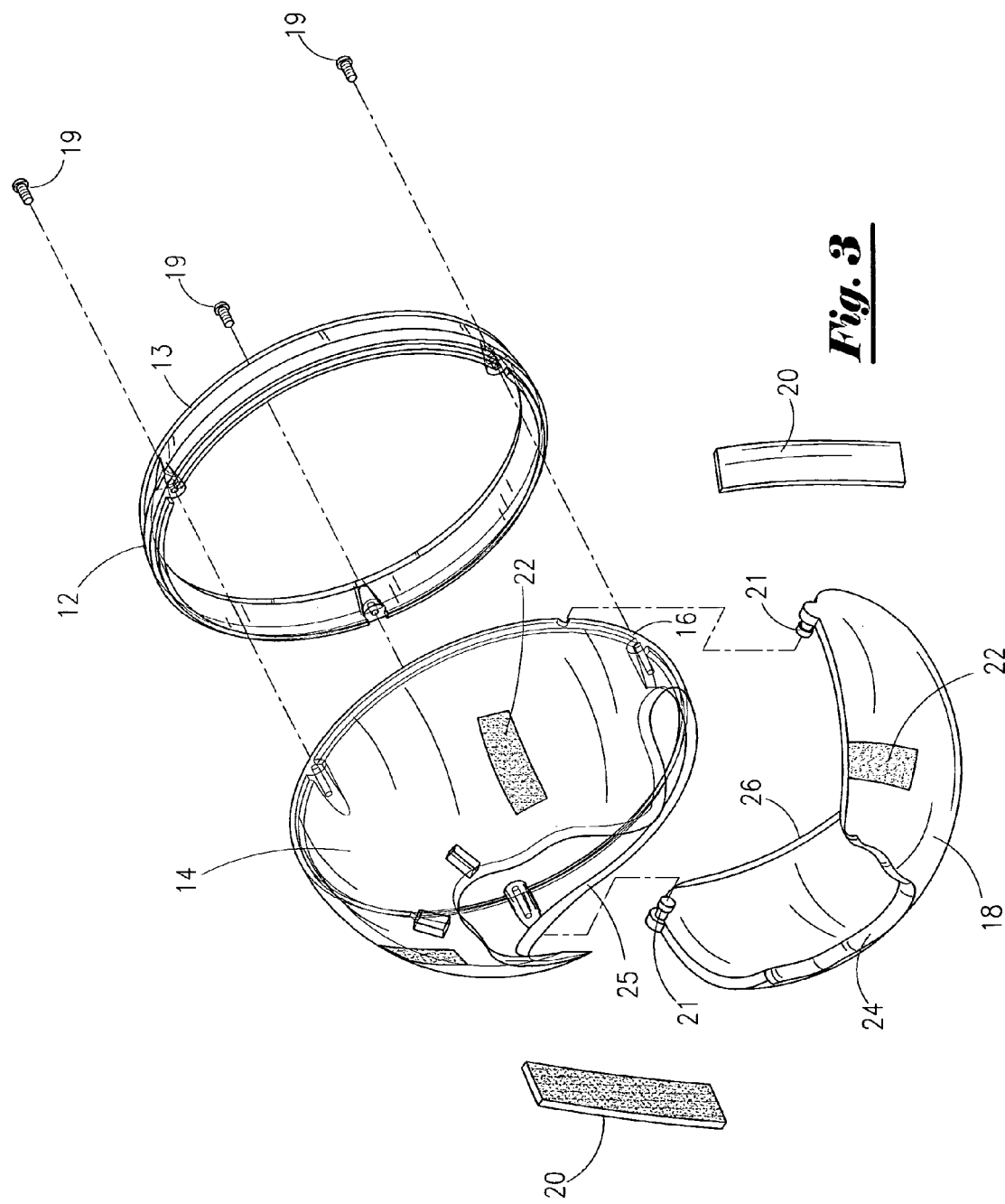
FIG. 3 is a rear isometric assembly view of the animal collar apparatus with optional cylindrical ring.

Looking now at the hemispherical assembly 10 as seen disassembled in FIG. 3, the visor member 18 is pivotal about the pins 21 and includes a relatively large parabolic shaped notch 24 along one edge. It should also be noted that the cutout edge is rolled outwardly and may include a soft material bonded or otherwise attached thereto. The soft bonded material may also be added to the leading edge 26. In general the visor 18 is a flexible, semi-rigid, transparent or opaque member.

The hemispherical member 14 is a transparent, lightweight, polymeric member and includes an irregular aperture 25 that begins at the polar region and extends relatively close to the parting line 16, and is rolled inwardly and may also be fitted with a soft edging material.

As earlier stipulated the cylindrical extension ring 12 is optional and attachable with the fasteners 19 and may also include a bonded soft edging material along its leading edge 13.

Figure 4:
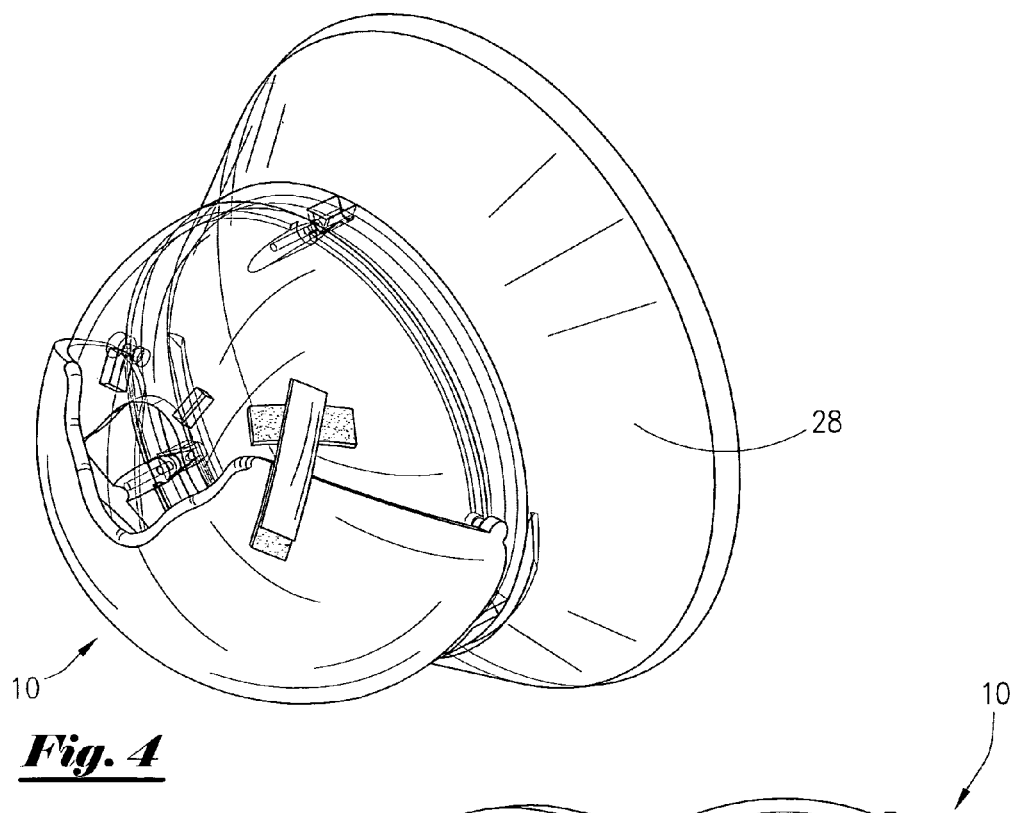
FIG. 4 is a front isometric assembly view of the animal collar apparatus with optional cylindrical ring.
Figure 5:
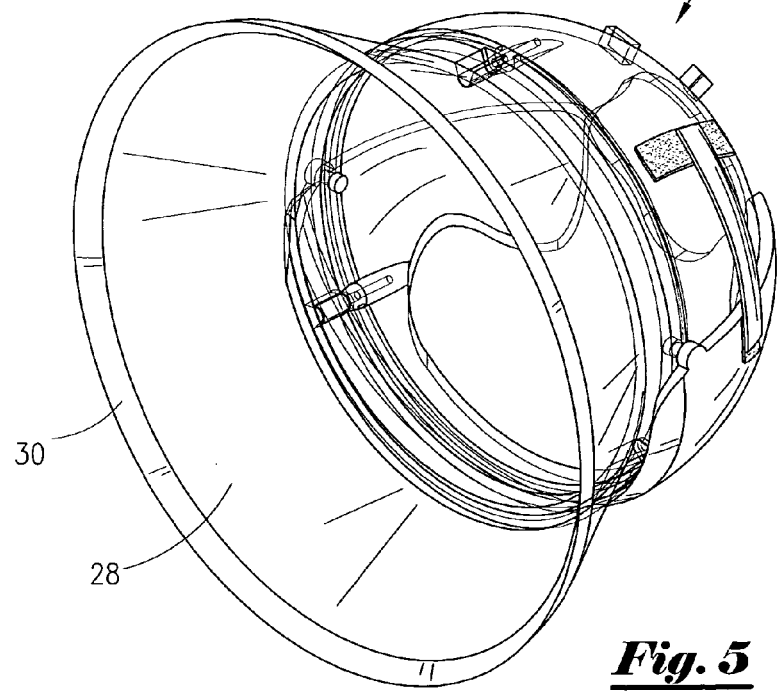
FIG. 5 is a rear isometric assembly view of the animal collar apparatus with optional conical ring.

Looking now at FIG. 4 we see that the hemispherical assembly 10 can just as easily be fitted with a conical extension ring attachment 28 in the same manner as the cylindrical ring attachment 12. The conical attachment 28 is designed to extend slightly beyond the animals eyes. thereby preventing the animal from rubbing or scratching its head and thus perhaps injuring facial wounds etc. The leading edge 30 seen in FIG. 5 may also be fitted with a protective edge molding.

Figure 6:
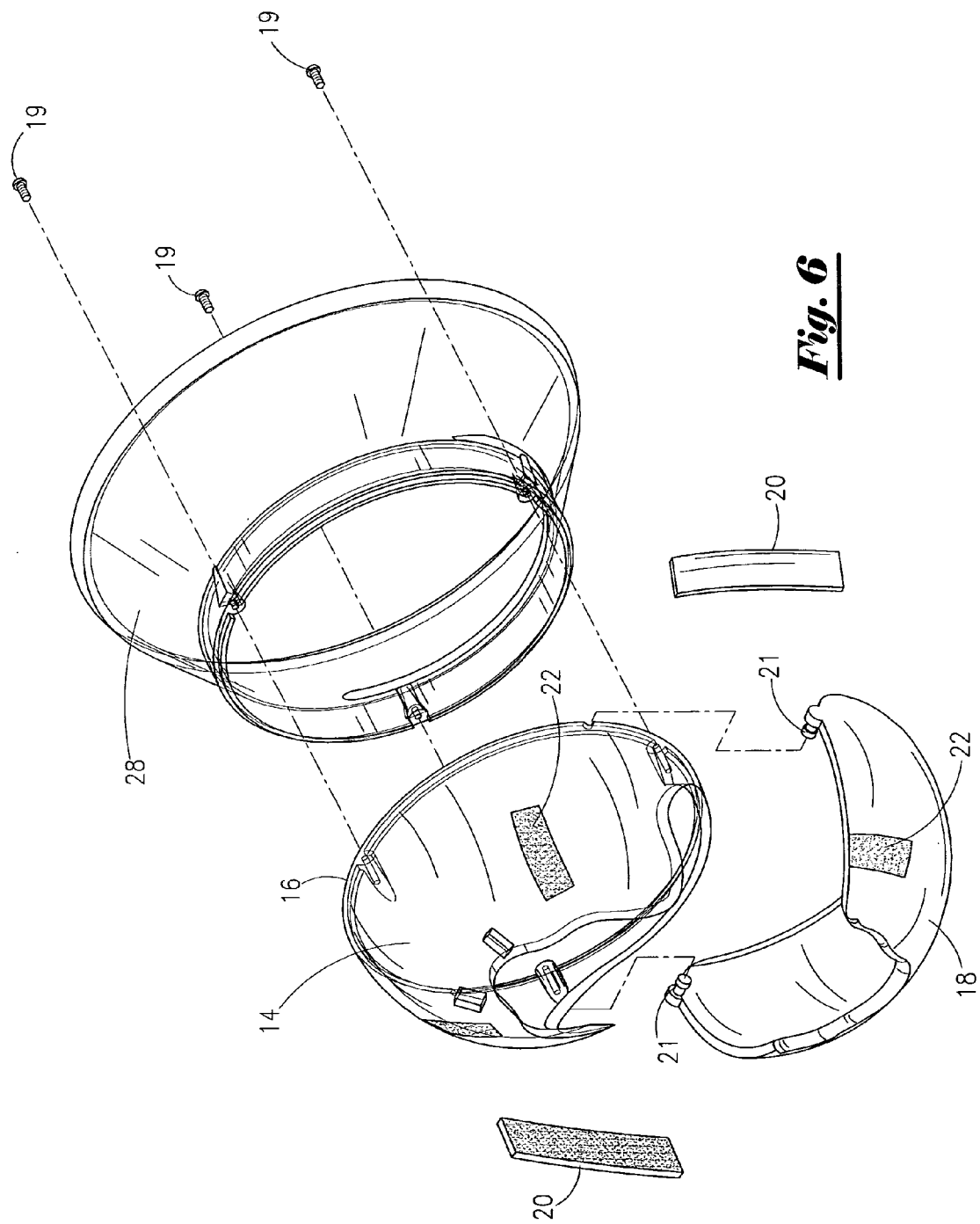
FIG. 6 is a front isometric assembly view of the animal collar apparatus with optional conical ring.

As seen in FIG. 6 the hemispherical collar assembly 10 is the same as that shown in FIGS. 1–3 except that the cylindrical ring member 12 is replace by a conical member 28. The visor 18 is likewise pivotally captured between the hemispherical member 14 and the conical ring 28 at assembly.

Turning now to FIG. 7 we see that when the visor 18 is pivotally rotated until the leading edge 32 is adjacent to or extending beyond the leading edge 13 of the ring 12, the neck aperture 25 of the hemispherical member 14 and the parabolic shaped cutout 24 form an opening of sufficient size to allow the animals head 34 to pass into the hemispherical member 14. The irregular opening is designed to accommodate a relatively wide range of animal neck sizes and allow for easy insertion of an animal's head. By rotating the visor 18 toward the animal, as seen in FIG. 7, the opening then becomes smaller to accommodate animals with small necks. Once an animal's head is captured between the visor member 18 and the hemispherical member 14, the visor is secured in place by hook and loop fasteners 20, 22 for fast locking.

As seen in FIG. 8 larger animals having a larger head and/or longer muzzle using the conical adapter 28 can still utilize the visor 18; however it should be noted that the opening in the hemispherical assembly 10 is limited by the leading edge 32 of the visor engagement with the conical adapter 28. In such cases where an animal head 36 is too large to pass through the opening but has a relatively small neck, the conical adapter ring 28 is installed after the hemispherical assembly is placed around the animal's neck or a modified visor may be used that provides a larger neck opening.

Figure 10:
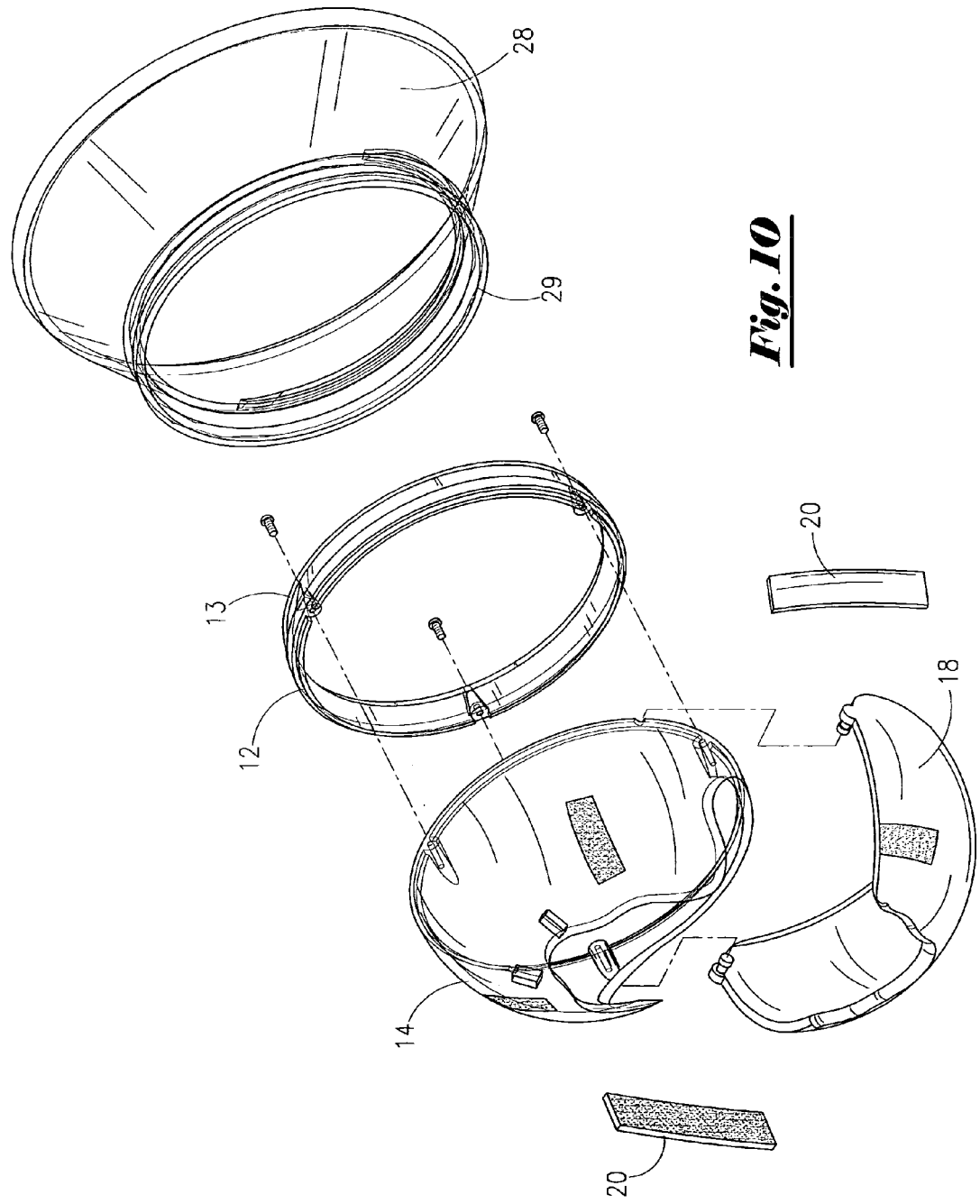
FIG. 10 is an exploded view of the animal collar apparatus with optional cylindrical ring and adaptive conical ring.
Figure 11:
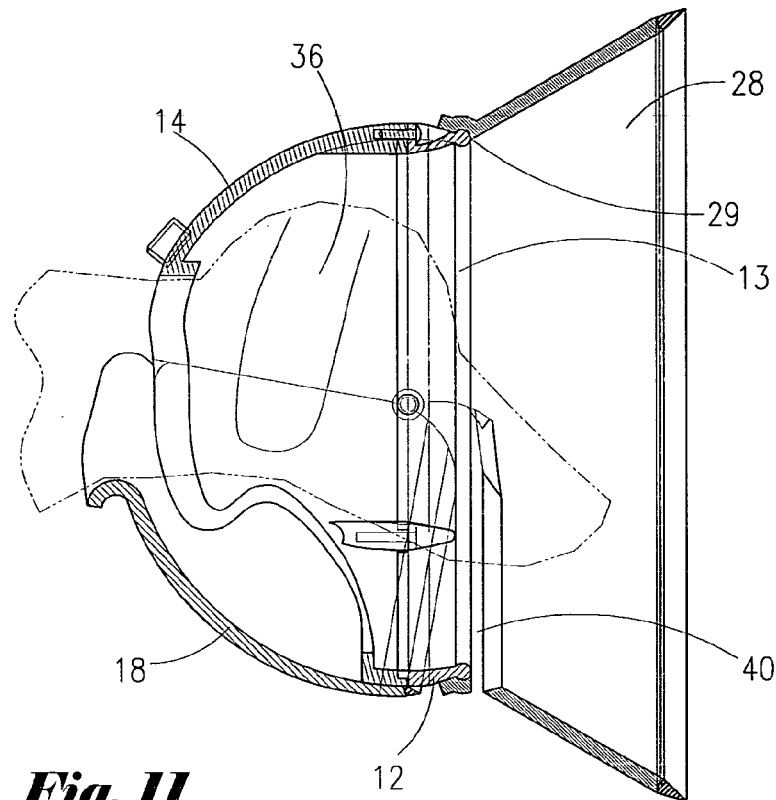
FIG. 11 is a side elevation cross section of the optional cylindrical ring and adaptive conical ring assembly with visor closed.
Figure 12:
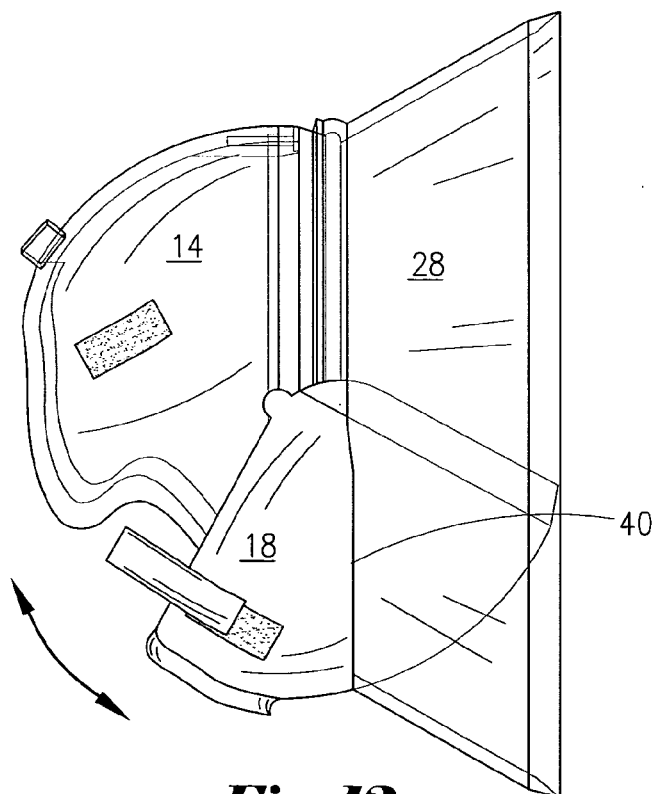
FIG. 12 is a side elevation of the optional cylindrical ring and adaptive conical ring assembly with visor in the open position.

Alternatively, the leading edge 13 of the cylindrical ring 12 can be beaded as seen in FIG. 7 and FIG. 9 and made cooperative with a snap channel 29 located at the small diameter of the conical extension member 28 seen in FIG. 10, thereby allowing the conical member to be snapped onto the cylindrical ring after the assembly has been placed on the animals head 36 as seen in FIG. 11. However, in some cases the conical member 28 may be provided with a slot 40 seen in FIG. 11 for permitting the visor to pass through the conical member 28 as shown in FIG. 12. This allows a full length visor to be fully opened to allow passage of the animal's head with the conical member in place. At first glance it would seem that the visor 18 would interfere with the passage of the animal's head. However, it should be kept in mind that the entire assembly 10 can be rotated so that the visor 18 is on top thus providing passage of the animal's head 36 for a short time until the visor 18 is rotated towards the animal's neck and locked behind the animal's head.

In use, the hemispherical assembly 10 is opened to the fully open position, as seen in FIG. 9, then placed over an animal's head and secured around its neck, as seen in FIGS. 7 and 8. The visor member 18 is then pivoted forward and held in this position by the user's left hand while the right hand rotates the globe 10 relative to the visor 18, thereby capturing the animal's head 36, as seen in FIG. 8. The visor member 18 is then secured in position with straps 20 in contact with pads 22.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A protective animal collar assembly comprising:
   a) a single hollow, hemispherical member having equatorial and polar regions and an irregular opening therein extending from said polar region to near proximity with said equatorial region;
   b) a conical ring member having a minor diameter equivalent to that of said equatorial region of said hemispherical member and said minor diameter removably attached to said hemispherical member at said equatorial region;
   c) a visor member having a parabolic notch along one edge corresponding at least in part to a portion of said irregular opening, pivotally attached to said hemispherical member; and
   d) a means for securing said visor in position relative to said hemispherical member.

2. The protective animal collar according to claim 1 wherein said visor member at least partially covers said irregular opening in said hemispherical member.

3. The protective animal collar according to claim 1 wherein said parabolic notch is disposed adjacent said polar region defining a parabolic opening between said visor member and said hemispherical member.

4. The protective animal collar according to claim 3 wherein said means for securing are hook and latch members strategically located adjacent said parabolic opening.

5. The protective animal collar according to claim 1 further comprises protective edge moldings.

6. The protective animal collar according to claim 1 further comprises a cylindrical ring member having a major diameter equivalent to that of said hemispherical member removably attached to said hemispherical member at said equatorial region.

7. The protective animal collar according to claim 6 wherein said visor member is pivotally retained by said cylindrical ring member.

8. The protective animal collar according to claim 6 wherein said cylindrical member further comprises a beaded rim along the leading edge.

9. The protective animal collar according to claim 8 wherein said animal collar comprises said cylindrical member and a conical ring member having a minor diameter portion equivalent to said cylindrical member and further comprising a channel portion for making a snap connection with said beaded rim.

10. The protective animal collar according to claim 9 wherein said conical ring member is slotted so as to allow passage of a portion of said visor member.

11. The protective animal collar according to claim 1 wherein said visor member is pivotally retained by said conical ring member.

12. A protective animal collar assembly comprising:
   a single hollow hemispherical member having a polar region and equatorial region defined by the major diameter, and an irregular shaped aperture, a portion of which is parabolic extending from said polar region to near proximity with said equatorial region, a visor having a parabolic notch centrally located along one edge pivotally attached to said hemispherical member at said major diameter said notch corresponding to the parabolic portion of said hemispherical member defining a parabolic opening there between, and a means for variably fixing said visor relative to said hemispherical member, said hemispherical member having a conical ring member having a minor diameter equivalent to that of said equatorial region of said hemispherical member and said minor diameter removably attached to said hemispherical member at said equatorial region.

13. The protective animal collar assembly according to claim 12 further including a cylindrical extension ring adaptively connected to said hemispherical member at said major diameter.

14. A method for preventing self inflected wounds and the contamination of wounds resulting from licking and biting by attaching a protective, hemispheric, shell around the neck of an animal comprising the steps of;
   a) providing a single hollow, hemispherical member having equatorial and polar regions and an irregular opening therein extending from said polar region to near proximity with said equatorial region, a conical ring member having a minor diameter equivalent to that of said equatorial region of said hemispherical member and said minor diameter removably attached to said hemispherical member at said equatorial region, a visor member having a parabolic notch alone one edge corresponding at least in part to a portion of said irregular opening, pivotally attached to said hemispherical member and a means for securing said visor in position relative to said hemispherical member,
   b) opening said visor member pivotally relative to said shell, thereby forming a parabolic opening through which an animal's head is inserted and
   c) closing said visor, thus closing said parabolic opening around the animal's neck and securing said visor relative to said shell.

15. The method according to claim 14 wherein said method further includes the step of extending said shell by attaching a cylindrical ring member.

16. The method according to claim 15 wherein said method further includes the step of removing said conical ring member prior to attaching said cylindrical ring member.

* * * * *